United States Patent [19]

Chun

[11] Patent Number: 5,037,169

[45] Date of Patent: Aug. 6, 1991

[54] HIGH SPEED LOW LOSS OPTICAL SWITCH FOR OPTICAL COMMUNICATION SYSTEMS

[75] Inventor: Cornell S. L. Chun, Eagan, Minn.

[73] Assignee: Unisys Corporation, Blue Bell, Pa.

[21] Appl. No.: 482,117

[22] Filed: Feb. 20, 1990

[51] Int. Cl.⁵ .............................................. G02F 1/29
[52] U.S. Cl. ...................................... 385/16; 359/320
[58] Field of Search ............ 350/354, 355, 358, 96.13, 350/96.15, 96.14, 96.34; 356/352

[56] References Cited

U.S. PATENT DOCUMENTS

| | | | |
|---|---|---|---|
| 4,525,687 | 6/1985 | Chemla et al. | 350/355 X |
| 4,573,767 | 3/1986 | Jewell | 350/354 |
| 4,585,301 | 4/1986 | Bialkowski | 350/354 X |
| 4,947,223 | 8/1990 | Biefeld et al. | 350/355 X |

*Primary Examiner*—John D. Lee
*Assistant Examiner*—John Ngo

*Attorney, Agent, or Firm*—Albert B. Cooper; Glenn W. Bowen; Mark T. Starr

[57] ABSTRACT

A Fabry-Perot etalon is utilized as an optical switch for controllably switching an input optical signal on an input optical conduit between first and second output optical conduits. The etalon is comprised of a cavity formed by plane parallel periodic multilayer reflective surfaces with a variable index of refraction semiconductor medium sandwiched therebetween. The medium and periodic multilayer structures comprise, for example, Aluminum Gallium Arsenide. An optical pump injects an optical control beam into the medium to vary the index of refraction of the medium so as to cause the input optical signal to either be reflected from the cavity into the first output conduit or transmitted through the cavity to the second output conduit. Alternatively, electric fields, thermal fields, or injected carriers can be applied to the medium to vary the index of refraction thereof, thereby effecting the optical switching action.

17 Claims, 4 Drawing Sheets

HIGH SPEED LOW LOSS OPTICAL SWITCH FOR OPTICAL COMMUNICATION SYSTEMS

BACKGROUND OF THE INVENTION

1. Field of the Invention

The invention relates to optical communication systems particularly with respect to switching optical data signals between optical channels with high speed and low insertion loss.

2. Description of the Prior Art

Many mechanisms are known in the prior art selectively switching an optical information signal between two or more optical channels. For example, mechanical devices are utilized that selectively position an output face of an optical fiber adjacent input faces of plural optical fiber output channels for switching the input optical signal to selected optical output channels. Other mechanical devices include positionable mirrors and lenses to switch the light beams among the channels. Such mechanical devices, including the motive means thereof, tend to be unacceptably slow in operation for use in optical communication systems, as well as tending to be unreliable and bulky.

The prior art also contemplates non-mechanical switching arrangements utilizing an electro-optic effect or an acoustic-optic effect. Such prior art optical switches which utilize diffraction tend to lose optical intensity into the side lobes thereof resulting in less signal into the intended output channel. Such switches utilizing diffraction methods also tend to deflect a portion of the optical signal into non-selected output channels resulting in non-zero extinction ratios for these channels. In the prior art optical switches utilizing the electro-optic effect, the light signal is coupled into and out of a lossy electro-optic medium thereby introducing undesirably high insertion losses.

Another disadvantage of the prior art optical switches is that, generally, a stable electronic signal must be maintained for the switched and unswitched states of the devices. For example, in electro-optic switches a controlled voltage must be applied to change output channels. Thus, such electro-optic switches require precision voltage control circuitry. In the prior art acousto-optic switches, a controlled electronic frequency signal is required for diffraction of the light in the desired direction. Thus, such acousto-optic switches require a precise electronic frequency signal generator.

SUMMARY OF THE INVENTION

A high speed and low insertion loss optical switch is provided by utilizing a Fabry-Perot input light beam incident interferometer or etalon. An input light beam incident on the etalon is selectively reflected therefrom or transmitted therethrough in accordance with the index of refraction of the etalon cavity medium. The switch includes means for controlling the index of refraction of the medium so as to switch the input light beam between the reflected beam and the transmitted beam thereby switching the input light beam between two output channels. The etalon cavity medium preferably comprises a semiconductor material with controllable index of refraction and the control means preferably comprises an optical pump injecting an optical pump control beam into the medium. Alternatively, switching control may be effected by an electric field (electro-optic effect) or thermal field applied to the medium or by the injection of electrons and holes into the medium.

DESCRIPTION OF THE PREFERRED EMBODIMENTS

Figure 1:
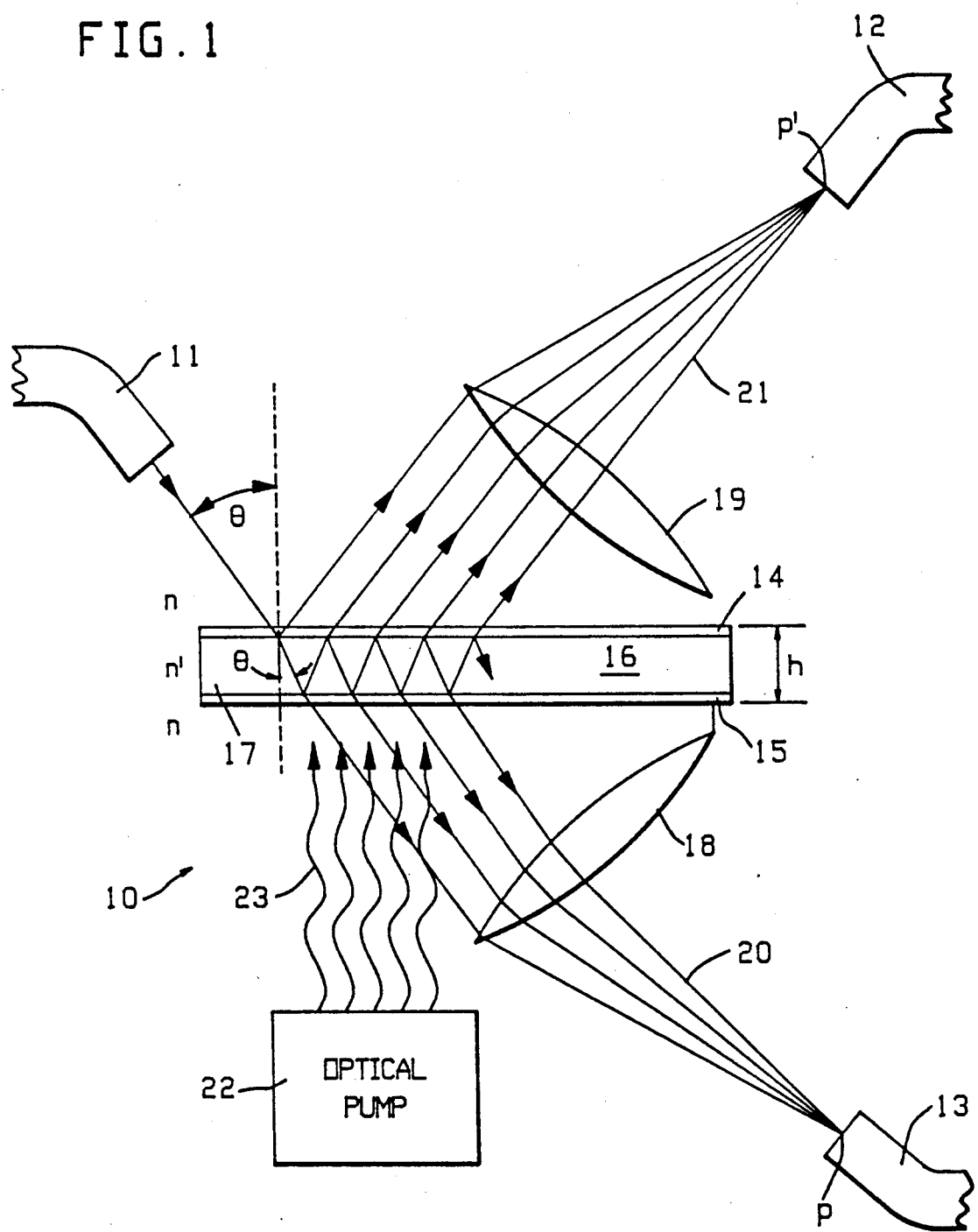
FIG. 1 is a schematic illustration of a Fabry-Perot etalon implemented in accordance with the present invention, where switching control is effected by an optical pump beam.

Referring to FIG. 1, a Fabry-Perot interferometer or etalon 10 is illustrated, implemented in accordance with the invention to switch an input data optical beam on an input optical conduit 11 between output optical conduits 12 and 13. The conduits 11–13 may, for example, comprise optical fibers. It is appreciated, that the basic Fabry-Perot etalon is a classical instrument, the structure and operation thereof being described in the text book *Principals of Optics*, M. Born and E. Wolf, 6th edition, sections 7.6.1 and 7.6.2. pages 323–333. The etalon 10 is comprised of plane parallel reflecting surfaces 14 and 15 with a separation h therebetween forming an optical cavity 16. Preferably, the optical cavity 16 includes an optical medium 17 having an index of refraction of n'. The etalon 10 is in a surrounding medium with an index of refraction of n. Monochromatic incident light from the input conduit 11 impinges on the reflective surface 14 at an angle $\theta$. The incident monochromatic light is transmitted and reflected by the plane parallel reflectors 14 and 15 undergoing constructive and destructive interference resulting in the light intensity being distributed between focal points P and p' of lenses 18 and 19, respectively. The incident light transmitted through the etalon 10 to the point P comprises a transmitted optical beam 20. The incident light reflected from the etalon 10 to the point p' forms a reflected optical beam 21. It is appreciated that the Fabry-Perot etalon transmits and reflects light signals with very low loss.

In accordance with the invention, the index of refraction n' of the medium 17 between the reflective surfaces 14 and 15 of the etalon 10 is varied in a controlled manner so that the incident light from the input conduit 11 is substantially completely switched between the points P and p'. When the etalon 10 is in the reflective mode, the incident beam from the input conduit 11 is reflected from the reflective surface 14 and focused by the lens 19 to form the reflected beam 21. The reflected beam 21 provides the output optical signal on the output optical conduit 12. When the etalon 10 is in the transmissive mode, the transmitted beam 20 focused by the lens 18 provides the output optical signal on the output optical conduit 13. Thus, the input optical beam from the input conduit 11 is switched between output conduits 12 and 13 in accordance with whether the etalon 10 is in the reflective or transmissive mode, respectively. The etalon 10 is switched between reflection and transmission preferably by an optical pump 22 that injects a control optical pump beam 23 into the medium 17. The optical pump beam 23 varies the index of refraction of the medium 17 to effect the switching.

A preferred embodiment of the invention is fabricated with an etalon comprised of epitaxially deposited layers of Aluminum Gallium Arsenide ($Al_xGa_{1-x}As$) with the incident optical input signal from the input conduit 11 having a wavelength of 850 nm. The spacing between the reflective surfaces 14 and 15 is 4.0 um and the index of refraction n is equal to 1. The medium 17 between the etalon reflecting surfaces 14 and 15 is composed of $Al_xGa_{1-x}As$ with index of refraction $n' = 3.57$ at room temperature thermal equilibrium. This index of refraction is obtained with $x = 0.1$. The reflecting surfaces 14 and 15 are non-absorbing and have a reflectance of 0.8. A method of constructing such a reflecting surface on $Al_xGa_{1-x}As$ will be later described. For construction convenience it is desirable that the angle of deflection $2\theta$ be approximately 90°. For this angle of deflection, $\theta$ is chosen as 43°.

Figure 2:
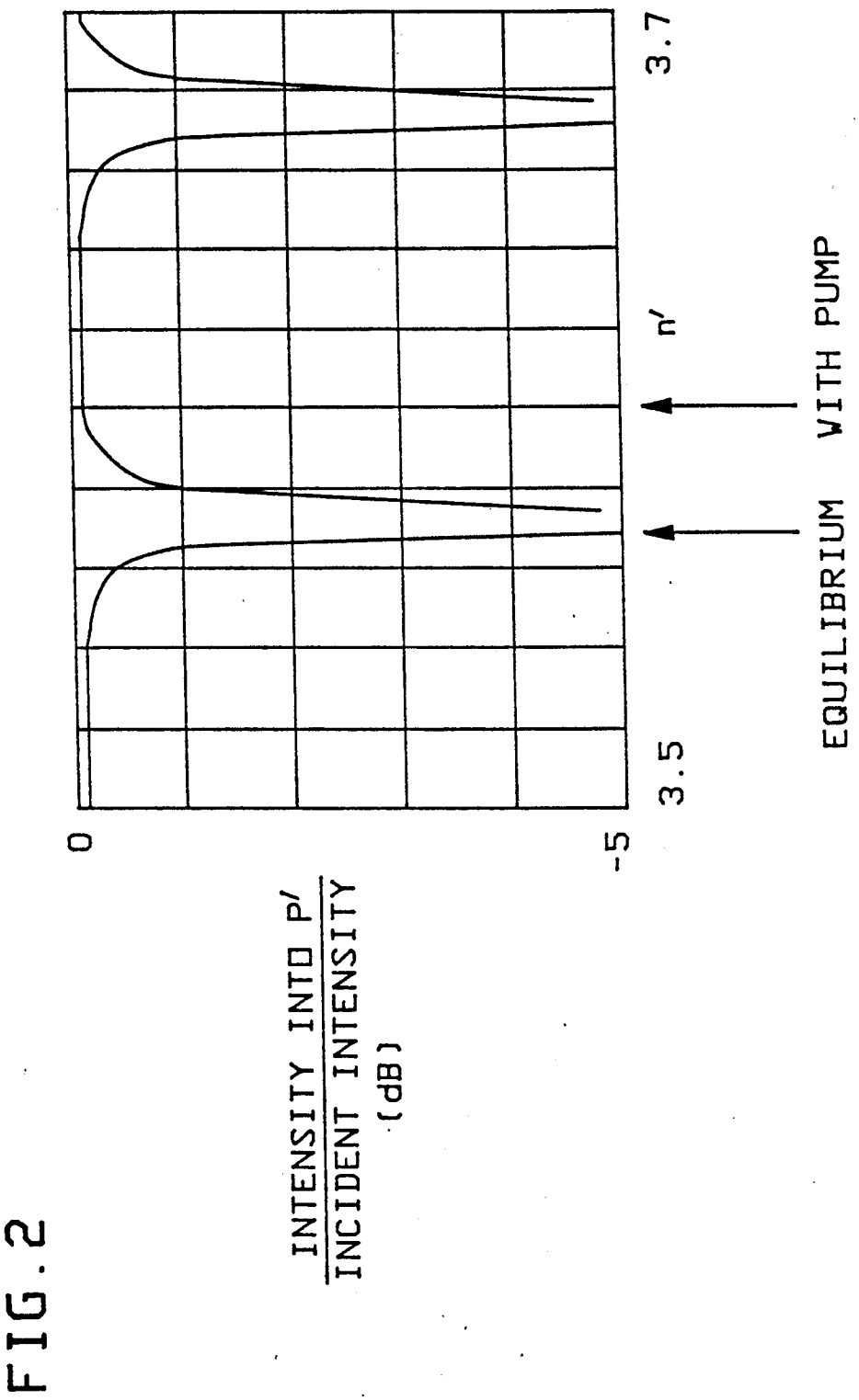
FIG. 2 is a graph of the ratio of the reflected intensity to the incident intensity versus index of refraction of the etalon medium illustrating operation in accordance with the invention.

Utilizing the analysis in the above referenced Born and Wolf text, the ratio of optical intensity $I^{(r)}$ deflected to P' to incident optical intensity $I^{(i)}$ as a function of $n'$ is calculated and the result illustrated in FIG. 2. Referring to FIG. 2, with continued reference to FIG. 1, at the equilibrium value of $n' = 3.57$ the deflected intensity is nearly zero and the intensity transmitted to P is nearly equal to the incident intensity. If, however, $n'$ is increased by more than 0.03, the intensity into p' abruptly increases to almost the total incident intensity while the beam into P diminishes to almost zero. Preferably, the increase in $n'$ is effected by the optical pump 22.

Various practical methods are known for effecting such an increase in the index of refraction of $Al_xGa_{1-x}As$. A paper entitled "Room-Temperature Optical Nonlinearities in GaAs", Y. H. Lee et al, Physical Review Letters, vol. 57 (19), page 2446 (1986), describes causing a change in index of refraction of greater than 0.03 in GaAs utilizing an optical pump beam of 8 mW on a 15 um diameter spot. Other methods to be described can also be used to increase $n'$ by the required amount to cause the etalon 10 to switch.

It is appreciated that at thermal equilibrium with $n' = 3.57$, the etalon 10 is quiescently transmissive thereby coupling the input conduit 11 to the output conduit 13 in the quiescent state of the etalon. Quiescent thermal equilibrium is readily maintained since in practical usage the device will probably reside in a thermally controlled environment such as the switch equipment room of a modern communication network. If a thermally controlled environment cannot be maintained, then feedback techniques can be used to compensate for temperature fluctuations in the environment. An example of such a technique is as follows. With reference to FIG. 2, it is appreciated that the intensity of the reflected optical power is a periodic function of $n'$. Suppose the medium is at an initial temperature T. In order to maintain the optical switch in the transmissive state, the optical pump beam 23 can be adjusted to have an intensity so as to maintain $n' = 3.677$. As the temperature of the medium 17 changes to T', $n'$ would change to, say, 3.60. The optical intensity of the transmitted beam 20 can be monitored, the loss of intensity can be detected, and a signal can be conveyed from the monitor to the optical pump 22. The signal will instruct the optical pump 22 to increase the intensity of the optical pump beam 23 so as to increase the intensity of the transmitted beam 20. In this manner the condition of $n' = 3.677$, i.e. the transmissive state of the optical switch, can be maintained against temperature fluctuations. This technique is commonly referred to in interferometry as maintaining phase quadrature. The etalon 10 can be switched into the reflective mode by further increasing the intensity of the optical pump beam 23 so as to increase $n'$ by more than 0.03; e.g., to more than $n' = 3.70$. The reflective mode can similarly be maintained against temperature fluctuations by using such feedback techniques. In this mode the intensity of the reflected beam 21 can be monitored in order to maintain the intensity of the reflected beam 21 at a maximum.

Figure 3:
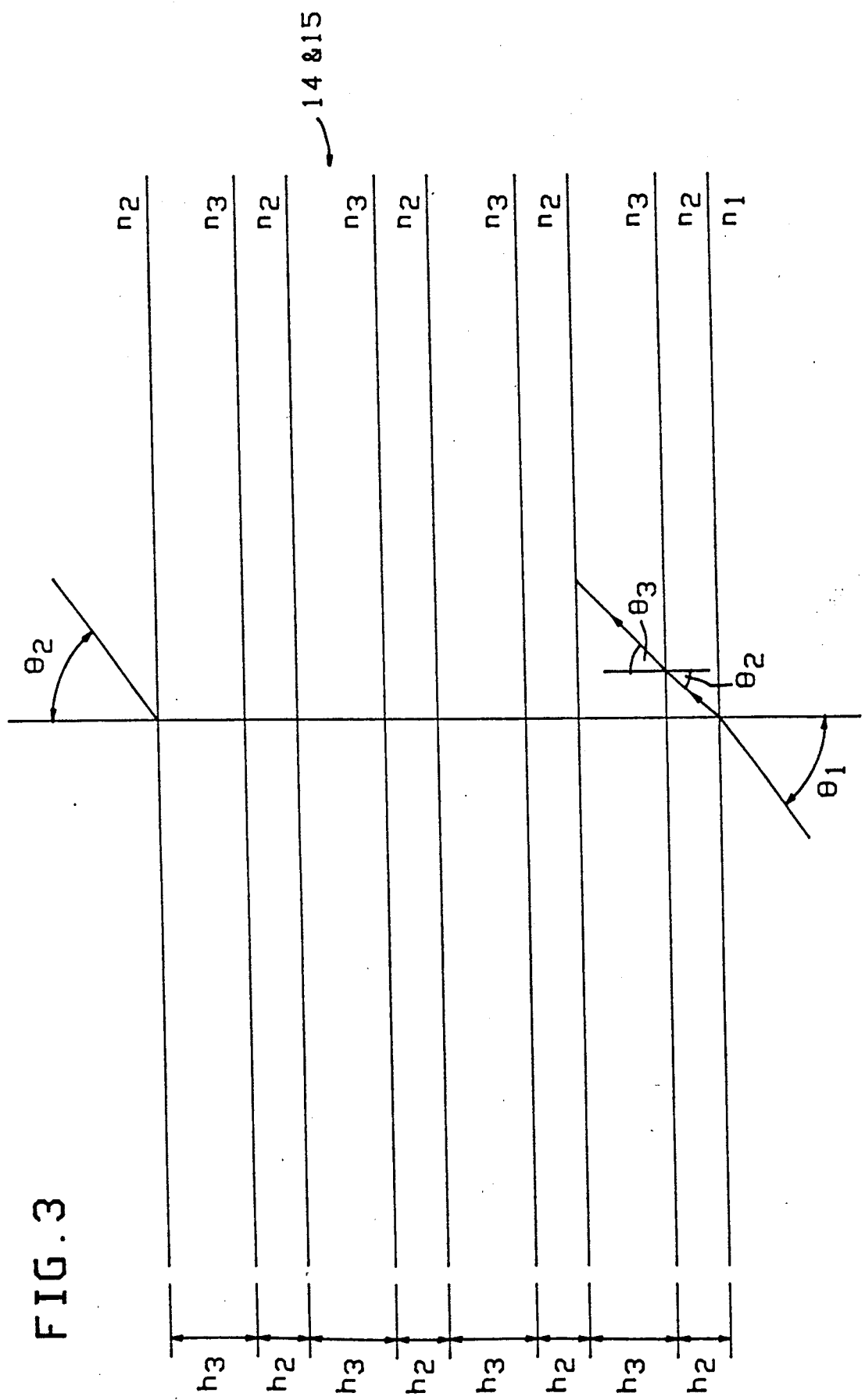
FIG. 3 is a schematic illustration of a periodic multilayer forming the etalon reflective surfaces.

As discussed above, it is desirable that the reflective surfaces 14 and 15 have a low absorption and a high reflectance of approximately 0.8 or greater. Each of such surfaces of the etalon 10 can be fabricated as a periodic multilayer of non-absorbing films as illustrated in FIG. 3. Such multilayers are described in the above referenced Born and Wolf text in Section 1.6.5 thereof on pages 66-70.

Referring to FIG. 3, where like reference numerals indicate like elements with respect to FIG. 1, it is convenient to calculate the reflectivity of the multilayer structure when the optical thicknesses of the layers $h_2$ and $h_3$ are a quarter of a wavelength of the monochromatic incident light. Preferably, the layers $h_2$ and $h_3$ are composed of $Al_xGa_{1-x}As$ with $x = 0.1$ and 0.9, respectively. In such an embodiment $n_2 = 3.57$ and $n_3 = 3.0$. Utilizing the analysis in the referenced Born and Wolf text, and letting $n_L = 3.57$ and $n_1 = 1$, a structure of five double layers will have a reflectivity of 0.82. For the reflective plate coatings 14 and 15 of the Fabry-Perot interferometer 10, the layers are arranged in succession characterized by the sequence $n_3, n_2, n_3, \ldots, n_2, n_3, n_2$ of refractive indices.

With reference to FIG. 1, it is appreciated that the effect of the optical pump 22 on the change in index of refraction $n'$ will be enhanced if the wavelength of the control beam 23 and the spacing h of the etalon 10 adjusted to create a resonance in the etalon 10. Such a resonance results in significantly larger electric fields in the etalon cavity 16 resulting in a larger variation in the index of refraction.

The embodiment of FIG. 1 was described in terms of utilizing the optical pump 22 to induce a change in the index of refraction of the medium 17 so as to switch the outputs of the Fabry-Perot etalon 10 between the output conduits 12 and 13. Instead of an optical pump, the change in index of refraction can alternatively be effected by (i) applying an electric field in the medium 17 (the electro-optic effect), (ii) increasing the temperature of the medium 17 to thermally excite free carriers, or (iii) increasing the free carrier concentration in the medium 17 by, for example, injecting electrons and holes from an external electrical circuit.

Figure 4:
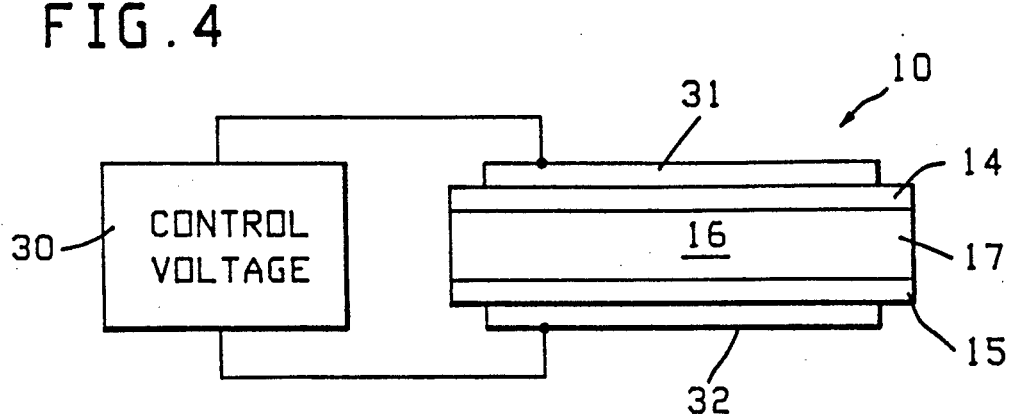
FIG. 4 is a schematic diagram of the etalon of FIG. 1 with an alternative switching control mechanism.

Referring to FIG. 4, in which like reference numerals indicate like elements with respect to FIG. 1, an alternative embodiment of the invention is illustrated where variation in the index of refraction of the medium 17 is effected by applying an electric field in the medium 17 (the electro-optic effect). A circuit 30 applies a control voltage across electrodes 31 and 32 to vary the electric field in the medium 17 thereby controlling the switching of the etalon 10.

Figure 5:
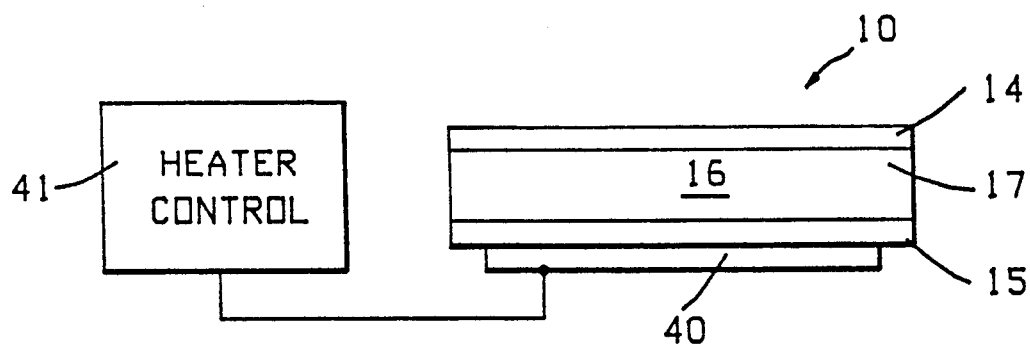
FIG. 5 is a schematic diagram of the etalon of FIG. 1 with a further alternative switching control mechanism.

Referring to FIG. 5, in which like reference numerals indicate like elements with respect to FIG. 1, an alternative embodiment of the invention is illustrated where the variation in the index of refraction is effected by varying the temperature of the medium 17. A heater 40 controlled by a heater control circuit 41 is included to provide the temperature variation.

Figure 6:
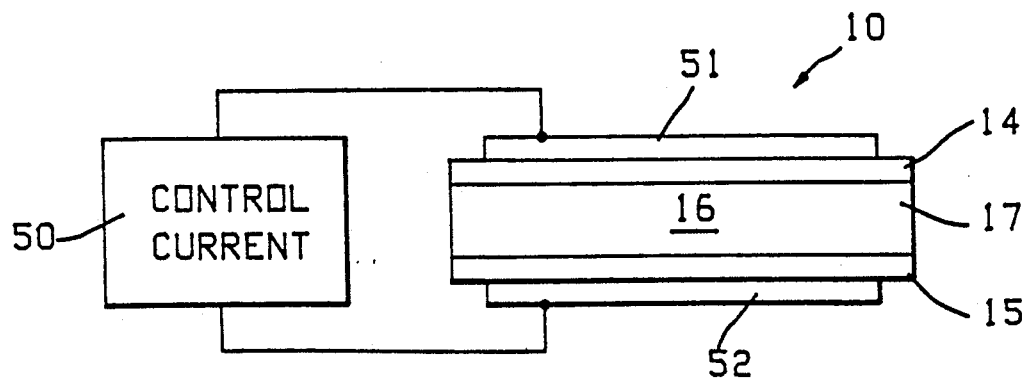
FIG. 6 is a schematic diagram of the etalon of FIG. 1 with another alternative switching control mechanism.

Referring to FIG. 6, in which like reference numerals indicate like elements with respect to FIG. 1, an alternative embodiment of the invention is illustrated where variation in the index of refraction of the medium 17 is effected by injecting carriers, electrons and holes, from an external electrical control circuit 50. The circuit 50 passes a control current through the medium 17 by means of electrodes 51 and 52 thereby controlling the switching of the etalon 10.

It is appreciated from the foregoing, that the present invention provides optical frequency selectivity of the transmission and reflection of the output beams. The principle of lightwave interference is involved in switching the optical signals. Optical signals with wavelengths different from the wavelength to which the interferometer is tuned will not be deflected. In the invention, switching is performed by the alteration of the index of refraction in the semiconductor medium 17 induced by optical, electronic or thermal means. The use of the dielectric multilayer structures 14 and 15 provide low loss and high reflectance. By varying the index of refraction of the medium 17, the invention provides an optical switching device utilizing the non-absorbing optical resonant cavity 16, which by its operation, provides switching between transmission and reflection with very low loss.

The switching device described herein is highly reproducible and readily fabricated since the switch can be constructed utilizing a well developed finely controlled process such as molecular beam epitaxy. Fabrication can be performed utilizing atomic layer control of semiconductor layer thickness and composition in epitaxial growth systems.

The invention can be fabricated having an extremely small size. The device has a thickness of several micrometers and lateral dimensions determined by the lateral dimensions of the two optical beams; viz, the controlling beam and the controlled beam. Such lateral dimensions are on the order of 10 to 100 micrometers. The switch of the present invention has a very high speed of response. The switching speed is limited by the electron-hole recombination time which is on the order of one nanosecond in Gallium Arsenide.

The present invention provides the capability in optical communication and optical computing systems for switching optical signals from one channel to several other channels with low loss. Accordingly, the optical switch illustrated herein is cascadable to switch an optical signal from one channel to one of several channels. Additionally, it is appreciated that the optical switch of the present invention is bi-directional in that it performs the same operation on forward and reverse propagating signals. The invention provides a solid state device that is stable against temperature, pressure, and electromagnetic disturbances. The resonant condition in the etalon is maintained by the thickness of a semiconductor solid which cannot be altered without extreme environmental conditions.

In the present invention, the control signal is zero for one state of the device or above a threshold for the other state. The ultimate magnitude of the control signal is not critical. The embodiment of FIG. 1 is an all optical device utilizing an optical controlling beam. Thus, the invention is compatible with signal processors with optical outputs.

It is appreciated from the foregoing, that the present invention provides an optical switch with high switching speed, small size, low cost, high reliability, and the ability to be controlled by another optical signal—light controlling light.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An optical switch for controllably switching an input optical signal on an input optical conduit between first and second output optical conduits, comprising:

a Fabry-Perot interferometer having first and second reflective surfaces with an optical medium therebetween, said optical medium having a controllably variable index of refraction, said reflective surfaces being parallel with respect to each other defining an optical cavity having said optical medium therein, said input optical signal being incident on said first reflective surface at an acute angle with respect thereto and being controllably reflected from said first reflective surface at an acute angle with respect thereto to said first output optical conduit or transmitted through said cavity to said second output optical conduit in accordance with said index of refraction of said medium, and control means coupled to said cavity for controllably varying said index of refraction of said medium so as to controllably switch said input optical signal between said first and second output optical conduits.

2. The switch of claim 1, wherein said control means comprises an optical pump for injecting an optical control beam into said medium so as to controllably vary said index of refraction thereof.

3. The switch of claim 1 wherein said control means comprises electrical circuit means coupled to said cavity for controllably varying said index of refraction of said medium by applying a variable electric field thereto.

4. The switch of claim 1 wherein said control means comprises thermal means coupled to said cavity for controllably varying said index of refraction of said medium by applying a variable thermal field thereto.

5. The switch of claim 1 wherein said control means comprises electrical circuit means coupled to said cavity for controllably varying said index of refraction of said medium by applying variable concentrations of injected electrons and injected holes.

6. The switch of claim 1 wherein said Fabry-Perot interferometer comprises a Fabry-Perot etalon.

7. The switch of claim 1 wherein each said first and second reflective surface comprises a periodic multilayer structure.

8. The switch of claim 7 wherein said periodic multilayer structure comprises layers of semiconductor material.

9. The switch of claim 8 wherein said periodic multilayer structure comprises layers of $Al_xGa_{1-x}As$.

10. The switch of claim 9 wherein said periodic multilayer structure comprises layers of $Al_xGa_{1-x}As$, where x is alternately 0.1 and 0.9.

11. The switch of claim 1 wherein said medium comprises semiconductor material.

12. The switch of claim 11 wherein said medium comprises $Al_xGa_{1-x}As$.

13. A method for controllably switching an input optical signal on an input optical conduit between first and second output optical conduits, comprising:

applying said input optical signal to be incident on a first reflective surface of a Fabry-Perot interferometer at an acute angle to said first reflective surface, said Fabry-Perot interferometer having a second reflective surface with an optical medium between said first and second reflective surfaces, said optical medium having a controllably variable index of refraction, said reflective surfaces being parallel with respect to each other defining an optical cavity therebetween having said optical medium therein, said input optical signal being controllably reflected from said first reflective surface to said first output optical conduit at an acute angle to said first reflective surface or transmitted through said cavity to said second output optical conduit in accordance with said index of refraction of said medium, and controllably varying said index of refraction of said medium so as to controllably switch said input optical signal between said first and second optical conduits.

14. The method of claim 13 wherein said step of controllably varying comprises injecting an optical control beam into said medium so as to controllably vary said index of refraction of said medium 15. The method of claim 13 wherein said step of controllably varying comprises applying a variable electric field to said medium so as to controllably vary said index of refraction of said medium 16. The method of claim 13 wherein said step of controllably varying comprises applying a variable thermal field to said medium so as to controllably vary said index of refraction of said medium.

17. The method of claim 13 wherein said step of controllably varying comprises applying variable concentrations of injected electrons and injected holes to said medium so as to controllably vary said index of refraction of said medium.

* * * * *